Dec. 22, 1964    R. S. ENGELBRECHT    3,162,826
NONRECIPROCAL WAVE TRANSMISSION DEVICES
Filed April 25, 1961    2 Sheets-Sheet 1
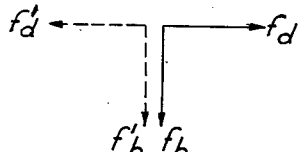
FIG. 3
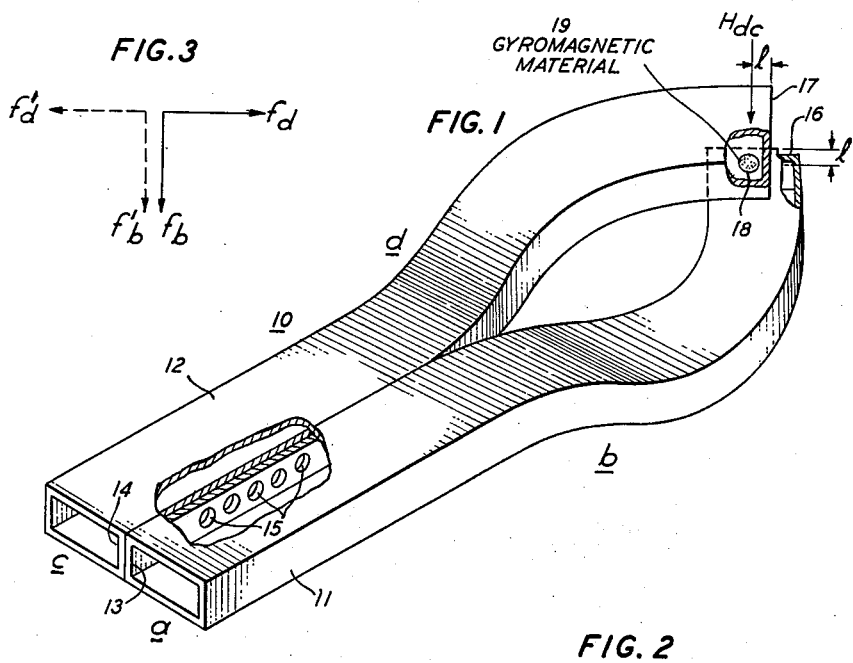
FIG. 1
FIG. 2
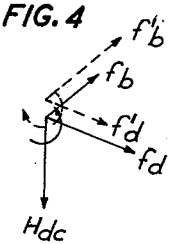
FIG. 4
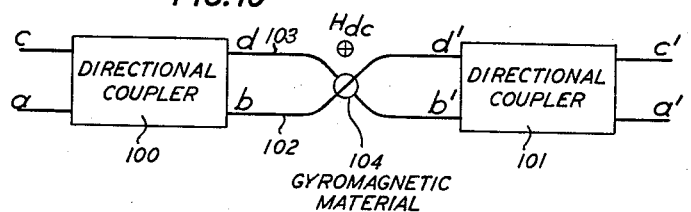
FIG. 10
INVENTOR
R. S. ENGELBRECHT
BY
Sylvan Sherman
ATTORNEY Dec. 22, 1964   R. S. ENGELBRECHT   3,162,826
NONRECIPROCAL WAVE TRANSMISSION DEVICES
Filed April 25, 1961   2 Sheets-Sheet 2
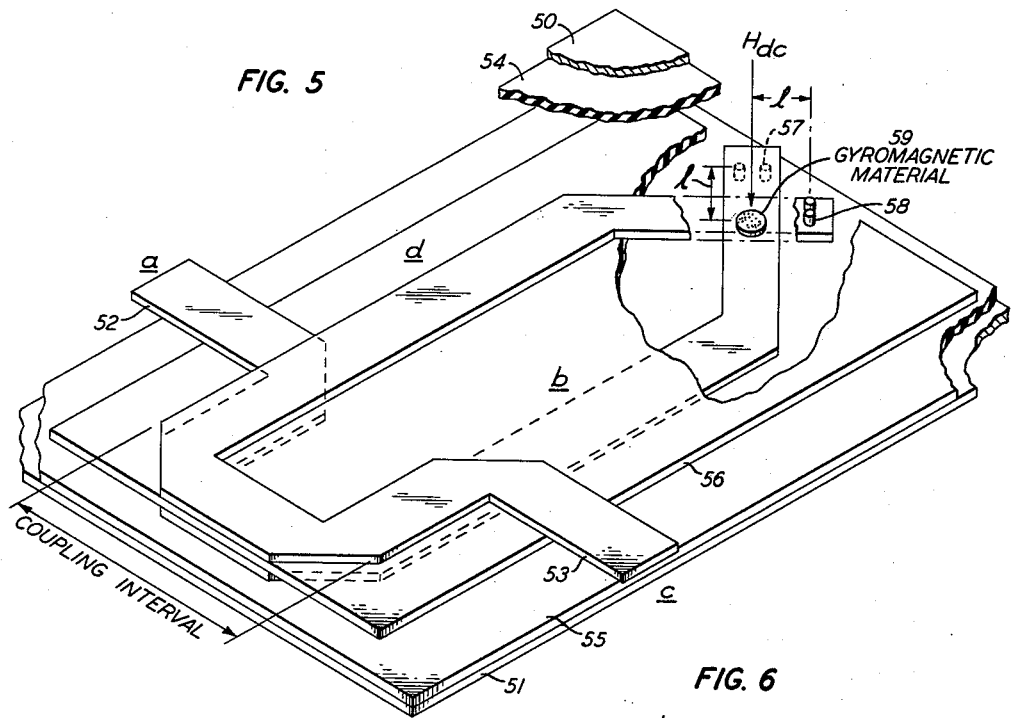
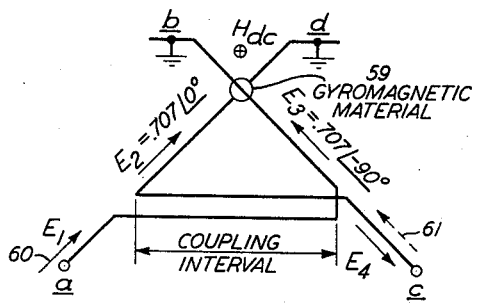
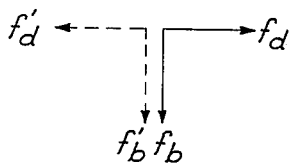
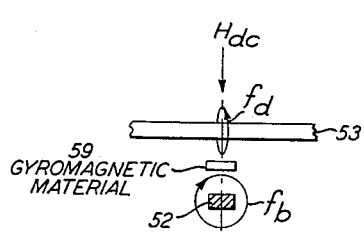
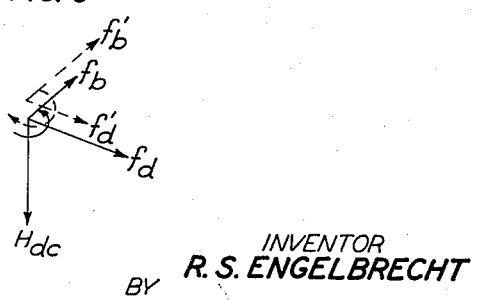
INVENTOR
R. S. ENGELBRECHT
BY
*Sylvan Sherman*
ATTORNEY

United States Patent Office 3,162,826
Patented Dec. 22, 1964

3,162,826
NONRECIPROCAL WAVE TRANSMISSION
DEVICES
Rudolf S. Engelbrecht, Basking Ridge, N.J., assignor to
Bell Telephone Laboratories, Incorporated, New York,
N.Y., a corporation of New York
Filed Apr. 25, 1961, Ser. No. 105,510
14 Claims. (Cl. 333—1.1)

This invention relates to electromagnetic wave transmission systems and more particularly to transmission structures having nonreciprocal attenuation properties for use in such systems.

The use of mtaerials having gyromagnetic properties to obtain both reciprocal and nonreciprocal transmission effects in electromagnetic circuits is widely known and has found numerous applications in propagation structures of both the waveguide and the two-conductor transmission line types.

Included among these new transmission components that have widespread use is the so-called "isolator." The isolator may be defined as a circuit element which is substantially transparent to electromagnetic waves propagating therethrough in one direction, designated the forward or low-loss direction, whereas electromangetic waves propagating in the reverse, or high-loss direction, are attenuated to the extent required by the system.

Nonreciprocal transmission effects are obtained by virtue of the fact that gyromagnetic materials respond differently under the influence of oppositely rotating circularly polarized magnetic fields. Accordingly, in an isolator an element of polarized gyromagnetic material is excited by means of a circularly polarized radio frequency magnetic field whose sense of polarization is a function of the direction of propagation of the electromagnetic wave energy. By adjusting the strength of the polarizing field applied to the material so as to produce a condition of gyromagnetic resonance, a substantial part of the high frequency wave energy is absorbed for one direction of wave propagation but is essentially unaffected for the other direction of propagation.

The more recent applications of this phenomenon are disclosed in the copending applications by H. Seidel, Serial No. 82,090, filed January 11, 1961, now United States Patent 3,102,244, issued August 27, 1963, E. G. Spencer, Serial No. 858,235, filed December 8, 1959, now abandoned, and J. J. Kostelnick, Serial No. 858,107, filed December 8, 1959, now United States Patent 3,016,497, issued January 9, 1962. The various devices described in the above-mentioned copending applications produce a region of circular polarization by means of two equal intersecting magnetic field components whose spatial phase angle, $\alpha$, and whose time phase angle, $\beta$, are related by $\alpha=(2n+1)\pi-\beta$. In each instance the time phase difference is produced by means of a length of transmission line or by means of a frequency sensitive reactance. Accordingly, these devices are inherently narrowband since the time phase difference is proportional to the operating frequency. Thus, as the frequency is changed over relatively narrow limits, the time phase difference changes. Unless the spatial phase angle is correspondingly adjusted, the resulting polarization is no longer circular but assumes, instead, an elliptical configuration. The result is to limit the bandwidth over which the isolator has a uniformly low forward loss and a uniformly high reverse loss.

It is, accordingly, the broad object of this invention to increase the frequency bandwidth over which a region of circularly polarized radio frequency magnetic field is generated.

It is a more specific object of this invention to increase the bandwidth over which the reverse to forward loss ratio of this type of gyromagnetic isolator is maintained uniformly constant.

In accordance with the invention, the time phase difference between two intersecting magnetic field components is established by means of a power dividing network having a broadband frequency transfer characteristic. A first preferred embodiment employs a small sample of gyromagnetic material which is placed between, and coupled to, one pair of crossed conjugate arms of a broadband 3 db directional coupler. Since it is an inherent property of a directional coupler that the wave energy in the conjugate arms have a ninety degree relative time phase difference, circular polarization of the high frequency magnetic field in the gyromagnetic material is obtained by crossing these arms at right angles. Thus oriented, wave energy applied to either of the other conjugate arms of the directional coupler generates a region of circular polarization at the gyromagnetic elements whose sense of rotation depends upon which one of said other conjugate arms is energized. To provide through transmission for the forward, or low-loss, direction of propagation, the crossed arms are terminated in a short-circuit.

In an alternative embodiment of the invention two power dividing networks are employed to provide a double isolator using but a single gyromagnetic element.

It is a feature of the invention that the time phase difference between the intersecting magnetic field components is obtained directly as a consequence of the power dividing operation. Thus, no additional phase delay circuits need be provided as in the prior art devices referred to above. Furthermore, techniques for obtaining broadband directional couplers are well known in the art. Hence, the time phase difference may be maintained relatively constant over a broad range of operating frequencies.

It is a further feature of the invention that the method of producing circular polarization described above may be readily applied to various types of transmission media such as, for example, hollow conductively bounded waveguides, balanced or unbalanced strip transmission lines and cylindrical coaxial lines.

These and other objects and advantages, the nature of the present invention and its various features will appear more fully upon consideration of the various illustrative embodiments now to be described in detail in connection with the accompanying drawings in which:

FIG. 1 is a perspective view of the first embodiment of the present invention utilizing rectangular waveguides;

FIG. 2 shows, by way of illustration, the distribution and phase relations of the wave energy within the network of FIG. 1;

FIG. 3 is a time vector diagram of the radio frequency magnetic fields in the region of the gyromagnetic material;

FIG. 4 shows, by way of illustration, the spatial orientation of the mangetic field vectors in the region of the gyromagnetic material;

FIG. 5 is a perspective view of a second embodiment of the invention utilizing a strip transmission line;

FIG. 6, given for purposes of explanation, shows the distribution and phase relationships of the wave energy within the network of FIG. 5;

FIG. 7 is a time vector diagram of the radio frequency magnetic fields in the region of the gyromagnetic material;

FIG. 8 is a close-up view of the crossover region of FIG. 5 showing the magnetic fields in the region of the gyromagnetic material;

FIG. 9 shows, by way of illustration, the spatial orientation of the magnetic field vectors in the region of the gyromagnetic material; and FIG. 10 is an alternative embodiment of the invention using two directional couplers.

Referring more particularly to FIG. 1, a perspective view of an illustrative embodiment of the present invention is shown connected and utilized to produce nonreciprocal transmission effects. Basically, the network shown comprises a broadband directional coupler 10 of conventional design with one pair of conjugate arms $b$ and $d$ connected in a manner to be described hereinafter. The directional coupler portion 10 comprises a first section 11 of electrical transmission line for guiding propagating wave energy which may be a rectangular waveguide of the metallic shield type having a wide internal cross-sectional dimension of at least one-half wavelength of the lowest frequency wave energy to be guided therethrough and a narrow dimension substantially one-half the wide dimension. Located adjacent line 11 and extending for a portion of its length contiguous and parallel thereto is a second section 12 of transmission line which has cross-sectional dimensions similar to those of guide 11. The narrow walls 13 and 14 of guides 11 and 12, respectively, are located adjacent to each other and the lines are coupled electromagnetically over an interval of several wavelengths by one of the several broadband coupling means familiar to the directional coupler art. This coupling may be, as illustrated, a plurality of apertures 15 extending through the adjacent narrow walls 13 and 14 of guides 11 and 12 and longitudinally distributed at intervals of less than one-half wavelength. In this illustrative embodiment of the invention, the distribution of coupling apertures is such as to transfer half the incident wave energy from one guide to the other. Such a directional coupler is generally referred to as a 3 db directional coupler. In addition, the coupling apertures are arranged so that the direction of propagation of the transferred wave energy is the same as the direction of propagation of the incident wave energy. Design techniques to produce these results are known in the art. (See United States Patent No. 2,701,340, issued to S. E. Miller on February 1, 1955, and United States Patent No. 2,834,944, issued to A. G. Fox on May 13, 1958.)

It is to be understood, however, that the invention is not limited to any particular type of directional coupler. Thus, other types of 3 db directional couplers can be used just as readily as will be demonstrated in conjunction with the description of the embodiment of FIG. 5. To avoid the necessity of making detailed reference to any particular power dividing structure, the term "3 db directional coupler" as used hereinafter shall be understood to define any four-armed power dividing network having the arms thereof arranged in pairs with the arms comprising each pair being conjugate to each other and in coupling relationship to the arms of the other of said pairs. It shall be further understood that the coupler introduces a ninety degree time phase difference (as measured at reference planes located at equal distances from a suitable plane of symmetry in the coupler) between the wave energy coupled to either pair of conjugate arms from either arm of the other pair of conjugate arms and that the power is divided substantially equally between the two conjugate arms when so energized.

For reference purposes hereinafter, the forward and backward ends of guide 11 are labeled $a$ and $b$, respectively, and the forward and backward ends of guide 12 are labeled $c$ and $d$, respectively. The arms $a$ and $c$ comprise one pair of conjugate arms of the 3 db directional coupler 10 while arms $b$ and $d$ comprise a second pair of conjugate arms.

In accordance with the invention, conjugate arms $b$ and $d$ are extended sufficiently to allow waveguide 12 to cross over waveguide 11 with the lower wide wall of guide 12 contiguous to the upper wide wall of guide 11. In particular, the two guides cross each other at right angles, that is, the longitudinal axis of guide 11 is perpendicular to the longitudinal axis of guide 12 at the crossover region. In addition, the electrical lengths of guide 11 and guide 12 from some suitable plane of symmetry in the coupler to the crossover region are made equal.

Extending through the center of the contiguous wide walls of guides 11 and 12 is an aperture 18 in which there is located an element of gyromagnetic material 19. The term "gyromagnetic material" is employed here in its accepted sense as designating the class of magnetically polarizable materials having unpaired spin systems involving portions of the atoms thereof that are capable of being aligned by an external magnetic polarizing field and which exhibit a processional motion at a frequency within the range contemplated by the invention under the combined influence of said polarizing field and an orthogonally directed varying magnetic field component. This precessional motion is characterized as having an angular momentum and a magnetic moment. Typical of such materials are certain ionized gases, paramagnetic materials and ferromagnetic materials, the latter including the spinels such as magnesium aluminum ferrite, aluminum zinc ferrite and the rare earth iron oxides having a garnet-like structure of the formula $A_3B_5O_{12}$ where O is oxygen, A is at least one element selected from the group consisting of yttrium and the rare earths having an atomic number between 62 and 71 inclusive, and B is iron optionally containing at least one element selected from the group consisting of gallium, aluminum, scandium, indium and chromium. In the particular embodiment of the invention shown in FIG. 1, a polycrystalline yttrium iron garnet is used.

The element of gyromagnetic material 19, in the illustrative embodiment of FIG. 1, is in the shape of a thin disk disposed with its broad surfaces parallel to the broad walls of guides 11 and 12. Element 19, however, may assume any other convenient shape since the particular shape is not critical to the operation of the invention. A static magnetic field $H_{dc}$ is applied perpendicular to the wide walls of guides 11 and 12 and is adjusted as will be explained in greater detail hereinafter.

The biasing field $H_{dc}$ may be supplied by any suitable means (not shown) such as an electric solenoid, a permanent magnetic structure or, in some instances, the gyromagnetic material itself may be permanently magnetized.

Guides 11 and 12 are each terminated by means of a low-loss reactive load. In the embodiment of FIG. 1, each guide is terminated by means of a shorting plane 16 and 17 located at a distance $l$ from the center of the gyromagnetic material 19. The distance $l$ is a small fraction of a wavelength, preferably less than an eighth of wavelength of the highest frequency of interest.

To produce efficient isolator action, conditions are established whereby energy is dissipated on one direction of transmission to a substantially smaller degree than in the reverse direction of transmission. In the isolators constructed in accordance with the invention, the phenomenon of gyromagnetic resonance is utilized to provide the necessary loss mechanism. As is well known, magnetically polarized gyromagnetic materials exhibit distinctly different properties depending upon the nature of the applied magnetic fields. These unusual properties which are produced can be explained by recognizing that the gyromagnetic materials contain unpaired electron or nuclear spins which tend to align themselves with the polarizing field but which can be made to precess about an axis parallel to the direction of this field by the application of a high frequency magnetic field. The magnetic moments associated with the spinning atomic particles, however, tend to precess in only one angular sense and resist rotation in the opposite sense. It is therefore evident that oppositely circularly polarized waves influence the gyromagnetic materially differently, depending upon their sense of rotation. This is so since a circularly polarized wave rotating in one direction is rotating in the easy angular direction of precession of the magnetic moments whereas an oppositely rotating circularly polarized wave is rotating in a sense inconsistent with the natural behavior of the magnetic moments of the gyromagnetic material. As a consequence, when the high frequency magnetic field is rotating in the same sense as the preferred direction of precession of the magnetic moments, it couples strongly to the gyromagnetic material. However, very little coupling takes place between the external magnetic field and the magnetic moments when the high frequency magnetic field is rotating in the opposite angular direction.

While this difference in coupling, and consequent difference in permeability provided by oppositely rotating circularly polarized magnetic fields, is not limited to any particular frequency or polarizing field strength, particularly useful effects are observed at gyromagnetic resonance when the frequency of the circularly polarized magnetic field is the same as the natural precessional frequency of the magnetic moments as determined by the strength of the polarizing field. Under these particular conditions, a large amount of power can be extracted from a magnetic field circularly polarized in the preferred sense and absorbed in the gyromagnetic material. However, very little power is absorbed from an oppositely circularly polarized component.

It is apparent, therefore, that a circularly polarized magnetic field must be generated whose sense of rotation is dependent upon the direction of propagation of the signal through the system.

FIG. 2, given for the purposes of explanation, shows the distribution and phase relationships of the wave energy within the network. Let us assume a signal $E_1$, represented by arrow 20, is applied to terminal $c$ of guide 12. After traversing the coupling interval, defined by apertures 15, half of the incident wave energy will have been transferred to arm $b$ of guide 11 and is represented by $E_2 = .707 \angle -90°$. The other half of the incident wave energy continues to propagate within guide 12 and is represented by $E_3 = .707 \angle 0°$. It will be noted that the transfererd wave energy $E_2$ lags the remaining component of incident wave energy $E_3$ by ninety degrees. Consequently, the transverse magnetic field components in guide 11 at the coupling aperture 18 lag the transverse magnetic field components in guide 12 by ninety degrees. This is illustrated in the time vector diagram of FIG. 3 where $f_b$ and $f_d$ represent the magnetic field components at aperture 18 in arms $b$ and $d$, respectively.

In addition to the phase difference, there is a ninety degree spatial phase difference between field components $f_b$ and $f_d$ as a result of the orientation of guides 11 and 12 as shown in FIG. 2. This spatial orientation of the high frequency magnetic field components and of the steady biasing field $H_{dc}$ is shown in the space vector diagram of FIG. 4 where the three mutually perpendicular magnetic vectors $H_{dc}$, $f_b$ and $f_d$ are represented. Because of the ninety degree time phase difference, as field $f_d$ passes through its maximum amplitude and starts to decerase towards zero, field $f_b$ is passing through zero and is starting to increase towards its maximum value. The effect of having the field components $f_d$ and $f_b$ varying in this manner is to produce the equivalent of a single resultant field vector which apepars to rotate in space in the region of the gyromagnetic material 19. With the polarizing field $H_{dc}$ directed normal to the plane of field components $f_d$ and $f_b$, as shown in FIG. 4, a negative or counterclockwise rotation is produced when viewed along the direction of the biasing field. This sense of circularly polarized magnetic field, however, is opposite to the natural precessional sense of the magnetic moments in the gyromagnetic material and little or no interaction takes place between the electrical energy and the gyromagnetic material. Substantially all of the wave energy associated with waves $E_2$ and $E_3$ continues to propagate past the gyromagnetic material to the transverse shorting planes 16 and 17 from which the energy is reflected. Upon traversing the gyromagnetic material after reflection the same relative time and space phase conditions prevail, again resulting in substantially no coupling to the gyromagnetic material so that the reflected wave energy continues to propagate substantially unattenuated toward the coupling interval.

Each of the reflected components $E_2'$ and $E_3'$, upon traversing the coupling interval, transfers half of its wave energy to the other guide producing components $$E_5' = .50 \angle 0°$$

and $$E_5 = .50 \angle -180°$$

in arm $c$ of guide 12 and components $$E_4' = .50 \angle -90°$$

and $$E_4 = .50 \angle -90°$$

in arm $a$ of guide 11. Because of the relative phase angles associated with the several components, components $E_5'$ and $E_5$ cancel so that the net output from arm $c$ is zero. Components $E_4'$ and $E_4$, on the other hand, being in time phase, produce an output wave $E_6$ in arm $a$, indicated by arrow 21, which is substantailly equal to the applied signal $E_1$.

When, on the other hand, wave energy $E_7$ is applied to arm $a$ of guide 11, indicated by the arrow 22, the situation is materially altered. While the magnetic field components $f_b'$ and $f_d'$ at the gyromagnetic material are still in space quadrature, as indicated by the dotted vectors in FIG. 4, there is, however a change in relative time phase relationship between these two magnetic field vectors. Because the incident wave is applied to guide 11, it is now the energy in arm $d$ of guide 12 which lags in time by ninety degrees, as shown in FIG. 3. As a consequence, the resulting field produced by $f_b'$ and $f_d'$ appears to rotate in a positive or clockwise sense as viewed along the direction of the biasing field $H_{dc}$. This sense of rotation is the same as the preferred sense for precession of the magnetic moments in the gyromagnetic material and, hence, incident wave energy is absorbed from the circuit and dissipated in the gyromagnetic material.

Furthermore, since the same relative time and space phase conditions prevail after reflection, reflected energy not initially dissipated in the gyromagnetic material has a second opportunity to be absorbed. There are, therefore, two absorptive passes in this type of isolator.

In the embodiment illustrated in FIG. 1, therefore, wave energy applied to arm $c$ of guide 12 propagates through the network, substantially unattenuated, and leaves by way of arm $a$ of guide 11. The direction of propagation $c$—$a$ is, therefore, the forward, or low-loss, direction. Energy applied to arm $a$, however, experiences substantial attenuation. Hence, the direction $a$—$c$ is the reverse, or high-loss, direction.

In the embodiment of FIG. 1 the coupling aperture 18 and the gyromagnetic material 19 are located along the center of a wide wall of guides 11 and 12 and a short distance from the shorting planes 16 and 17. This location is preferred for broadband applications since the transverse magnetic field components for all frequencies are large in the immediate vicinity of the shorting planes. As the distance from the shorting planes 16 and 17 is increased, the amplitude of the transverse field decreases for any particular frequency of wave energy in addition to changing as a function of frequency. Thus, by selecting the position of the gyromagnetic material relative to the shorting planes, the absolute attenuation, at any particular frequency and the relative attenuation over the frequency band of interest may be varied. The basic constraint on the location of the gyromagnetic material 19 for most efficient operation, however, is that it be located in a region of circular polarization.

The principles of the invention may also be applied to other types of transmission media. This is illustrated in FIG. 5 where there is shown a pair of balanced, or sandwich type, strip transmission lines connected to produce nonreciprocal transmission effects in accordance with the principles of the invention. The directional coupler is of the type described by James K. Shimizu in an article entitled "Strip-Line 3 db Directional Couplers," published in the 1957 Institute of Radio Engineers Wescon Convention Record, volume 1, Part 1, pages 4–15, and comprises an upper conductive ground plane 50 and a lower conductive ground plane 51 and the center conductors 52 and 53. The ground planes 50 and 51 which are common to both strip transmission lines are separated, in parallel relationship, from the center conductors 52 and 53 by means of the insulating material 54 and 55. Similarly, the center conductors 52 and 53 are, in turn, separated from each other by means of a layer of insulating material 56. The various layers of insulating material may be made of polystyrene, polyethylene, or any other suitable low-loss material.

The coupling interval and the dimensions of the center conductors are selected to transfer half of the incident power from one line to the other over the desired frequency range.

For reference purposes, the forward and backward ends of conductor 52 are labeled $a$ and $b$ respectively, and the forward and backward ends of conductor 53 are labeled $c$ and $d$. The arms $a$ and $c$ comprise one pair of conjugate arms of the 3 db directional coupler while arms $b$ and $d$ comprise a second pair of conjugate arms.

In accordance with the invention, conjugate arms $b$ and $d$ are extended sufficiently and bent so as to cross each other at right angles. A short distance $l$ beyond the cross-over region, arms $b$ and $d$ are terminated in a short-circuit by means of conductive pins 57 and 58 (or other convenient means) which conductively contact the respective arms and the ground planes 50 and 51. Located between arms 52 and 53 at the crossover region is an element of gyromagnetic material 59. The element of gyromagnetic material 59 is in the shape of a disk, disposed in an aperture in the insulating material 56 with its faces parallel to conductors 52 and 53 and parallel to the ground planes 50 and 51. As indicated previously, however, the gyromagnetic material may assume any other convenient shape since the particular shape is not critical to the operation of the invention.

A static magnetic field $H_{dc}$ is applied normal to the face of disk 59 in the direction shown and is adjusted to produce gyromagnetic resonance at the center of the frequency band of interest.

Before proceeding with a description of the operation of the embodiment of FIG. 5, two differences between the strip transmission line directional coupler and the waveguide directional coupler of FIG. 1 should be noted. First, the direction of coupling with coupled strip transmission lines is backward rather than forward. Thus, for example, if arm $a$ is fed, the coupled wave energy emerges from arm $d$ and no signal is present in arm $c$. The power emerging from arm $b$, in the case of an ideal, lossless structure, is simply the input power minus the coupled power. For a 3 db coupler the power in arms $b$ and $d$ is equal.

The second difference relates to the phase of the wave energy in arms $b$ and $d$. For the strip transmission line the remaining incident wave energy in arm $b$ lags the coupled wave energy in arm $d$ by ninety degrees.

FIG. 6, given for the purposes of explanation, shows the distribution and phase relationships of the wave energy within the network. Let us assume that a signal $E_1$, represented by the arrow 60, is applied to arm $a$ of conductor 52. After traversing the coupling interval, half of the incident wave energy will have been transferred to arm $d$ and is represented by $E_2 = .707 \angle 0°$. The other half of the incident wave energy continues to propagate along conductor 52 to arm $b$ and is represented by $E_3 = .707 \angle -90°$. It will be noted that the wave energy $E_3$ in arm $b$ lags the transferred wave energy $E_2$ by ninety degrees. Consequently, the high frequency magnetic field components surrounding conductor 53 in the region of the gyromagnetic material lags the magnetic field components surrounding conductor 52 by ninety degrees. This is illustrated in the time vector diagram of FIG. 7 where $f_b$ and $f_d$ represent the magnetic field components in arms $b$ and $d$, respectively, at the gyromagnetic material 59.

In addition to the time phase difference, there is a space phase difference between the field components $f_b$ and $f_d$ which results from the particular orientation of conductors 52 and 53 at the crossover region. FIG. 8, given for the purposes of explanation, is a close-up of the crossover region, showing the magnetic fields in the vicinity of the gyromagnetic material. In particular the magnetic fields are illustrated by the closed $f_b$ and $f_d$ encircling conductors 52 and 53, respectively. The planes of the respective loop are normal to the longitudinal axes of conductors 52 and 53. Since these conductors cross at right angles to each other, the magnetic field components are likewise normal to each other in the region of disk 59. The magnetic biasing field $H_{dc}$, also shown, is directed substantially normal to the face of disk 59 and is consequently normal to the field components $f_b$ and $f_d$. The spatial orientation of the several magnetic fields in the region of the gyromagnetic material is shown in the space vector diagram of FIG. 9. Because of the ninety degree time phase difference, as field $f_d$ passes through its maximum amplitude and starts to decrease toward zero, field $f_b$ is passing through zero and is starting to increase towards its maximum value. The effect of having the field components $f_d$ and $f_b$ varying in this manner is to produce the equivalent of a single resultant field vector which appears to rotate in space in the region of the gyromagnetic material 59. With the polarizing field $H_{dc}$ directed perpendicular to both $f_d$ and $f_b$, as shown in FIG. 9, a negative or counterclockwise rotation is produced when viewed along the direction of the biasing field. This sense of circularly polarized magnetic field, however, is opposite to the natural precessional sense of the magnetic moments in the gyromagnetic material and little or no interaction takes place between the electrical energy and the gyromagnetic material. Substantially all of the wave energy associated with wave $E_2$ and $E_3$ continues to propagate past the gyromagnetic material to the short-circuit terminations from which the energy is reflected. Since the same relative phase conditions prevail after reflection, there is, consequently, no interaction between the gyromagnetic material and the reflected waves so that the latter continue on to the coupling interval where they recombine and leave by way of arm $c$.

If, on the other hand, wave energy is applied to arm $c$, as indicated by the dotted arrow 61, there is a change in the relative time phase relationship between the magnetic field components at the crossover region. Specifically, component $f_d'$ encircling conductor 53 now lags component $f_b'$ encircling conductor 52 as shown by the dotted vectors in FIG. 7. Since $f_d'$ and $f_b'$ are still in space quadrature, the resulting field produced by $f_b'$ and $f_d'$ now appears to rotate in a positive, or clockwise, sense as viewed along the direction of the biasing field $H_{dc}$. This sense of rotation is the same as the preferred sense of precession for the gyromagnetic material and, hence, energy is absorbed from the circuit and dissipated in the gyromagnetic material. For the embodiment of FIG. 5, therefore, the forward, or low-loss, direction of propagation is $a-c$, and the reverse, or high loss direction, is $c-a$. For broadband operation, the crossover is preferable very near to the short-circuit terminations 57 and 58 for the reasons mentioned above. However, the crossover can be at any point along arms $b$ and $d$ without departing from the spirit and scope of the invention.

In both of the illustrative embodiments described above, a single directional coupler is used. Through transmission, in the low-loss direction, is obtained by means of the use of low-loss reflective terminations on the crossed arms. In an alternative embodiment, illustrated in block diagram in FIG. 10, two directional couplers 100 and 101 are used. One pair of conjugate arms $b$ and $d$ of coupler 100 is connected to one pair of conjugate arms $d'$ and $b'$, respectively, of coupler 101 by means of transmission lines 102 and 103. Lines 102 and 103 are crossed, as shown, and an element of gyromagnetic material 104 is placed between and electromagnetically coupled to said lines in the manner described above in connection with FIG. 1 or FIG. 5. The resulting structure is a double isolator. Assuming the phase relations of FIG. 2 to be applicable, power applied to arm $a$ of coupler 100 is attenuated whereas wave energy applied to arm $c$ of coupler 100 propagates freely to arm $c'$ of coupler 101. Similarly, wave energy applied to arm $c'$ is attenuated whereas energy applied to arm $a'$ propagates freely to arm $a$ of coupler 100.

One additional advantage of the embodiment of FIG. 10 resides in the fact that a double isolator is realized using but a single element of gyromagnetic material and a single biasing source.

In the analysis of the operation of the various embodiments of the invention, it was assumed that the intersecting magnetic fields $f_b$ and $f_d$ were of equal intensity and ninety degrees out of time and space phase. These are indeed the preferred conditions. However, some variation from these preferred conditions can be tolerated. Expressing the resultant high frequency magnetic field, $f$, at the gyromagnetic material in terms of its clockwise and counterclockwise rotating components $f_r$ and $f_l$, the loss ratio for the isolator is defined as $$R = \frac{|f_l|^2}{|f_r|^2}$$

In terms of the orthogonally intersecting magnetic field components $f_d$ and $f_b$, $$R = \frac{\left(\frac{|f_b|}{|f_d|} + 1\right)^2}{\left(\frac{|f_b|}{|f_d|} - 1\right)^2}$$

The following tabulation shows the variation of the loss ratio R for various field ratios.

| $f_b/f_a$ | R | R (db) |
|---|---|---|
| 0.8 | 81 | 19.0 |
| 0.9 | 361 | 25.5 |
| 1.0 | ∞ | ∞ |
| 1.1 | 441 | 26.5 |
| 1.2 | 121 | 20.8 |

A similar analysis can be made to show the variation of the loss ratio as the time phase and space phase deviates from ninety degrees.

Accordingly, it is apparent that the principles of the invention can be applied to embodiments wherein there are some deviations from the preferred conditions of orthogonality and equality of the intersecting magnetic fields.

In all cases it is understood that the above described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A nonreciprocal electromagnetic wave device comprising a four arm power dividing network, said network having the arms thereof arranged in pairs with the arms comprising each pair being conjugate to each other and in coupling relationship to the arms of the other of said pairs, said network being of the directional coupler type introducing a ninety degree time phase difference between wave energy coupled to either pair of conjugate arms from the arms of said other pair of conjugate arms, one arm of one of said pairs of arms crossing the other arm of said one pair at right angles in a region along their respective lengths, an element of magnetically polarized gyromagnetic material disposed between, and electromagnetically coupled to, said crossed arms, and means for terminating both of said crossed arms with a short circuit.

2. The combination according to claim 1 wherein said terminating means are located at equal distances along said arms from said gyromagnetic element.

3. An isolator for electromagnetic wave energy comprising first and second sections of rectangular waveguide each having a pair of narrow and a pair of wide conductive walls, said guides extending parallel to each other over a longitudinal portion of their length with a narrow wall of said first guide contiguous to a narrow wall of said second guide, a plurality of coupling apertures extending through said contiguous narrow walls longitudinally distributed along said guides, said guides crossing each other at right angles along a second portion of their length with a wide wall of one of said guides contiguous to a wide wall of the other of said guides, an element of magnetically polarized gyromagnetic material extending into each of said guides through an aperture in said contiguous wide walls, and means for terminating each of said crossed guides with a short circuit.

4. The combination according to claim 3 wherein said element is located in the center of said wide walls immediately adjacent to said terminating means.

5. In combination a 3 db directional coupler having four arms arranged in pairs with the arms comprising each pair being conjugate to each other and in coupling relationship to the arms of the other of said pairs, first and second wave transmission paths coupled to the two arms respectively of one of said pairs of conjugate arms, said paths oriented to cross each other at right angles at a region along their lengths, a magnetically polarized element of gyromagnetic material located between said crossed paths and electromagnetically coupled thereto, and means for terminating each of said paths with a short circuit.

6. The combination according to claim 5 wherein said paths comprise coaxial transmission lines and wherein said element is located within said crossover region between the center conductor of said first path and the center conductor of said second path.

7. The combination according to claim 5 wherein said paths comprise balanced strip transmission lines and wherein said element is located within said crossover region between the center conductor of said first path and the center conductor of said second path.

8. The combination according to claim 5 wherein said paths comprise unbalanced strip transmission lines each having a pair of planar conductors and wherein said element is located within said crossover region between one conductor of said first path and one conductor of said second path.

9. In an electromagnetic wave energy transmission system, an isolator comprising a directional coupler having four arms arranged in pairs with the arms comprising each pair being conjugate to each other and in coupling relationship to the arms of the other of said pairs, first and second sections of transmission line coupled to the two arms respectively of one of said pairs of conjugate arms, said wave energy as supported on said lines having transversely and longitudinally directed magnetic field components, said lines crossing each other along a portion of their lengths with the transversely and longitudinally directed components in said first path being perpendicular to the transversely and longitudinally directed components respectively in said second path, a single element of gyromagnetic material coupled to both of said lines, said element being positioned with respect to said lines to couple exclusively to one set of said orthogonally directed magnetic field components, and means for magnetically biasing said element in a direction perpendicular to said magnetic field components.

10. An isolator for electromagnetic wave energy comprising a 3 db directional coupler having four arms arranged in pairs with the arms comprising each pair being conjugate to each other and in coupling relationship to the arms of the other of said pairs, means for energizing said directional coupler over a band of frequencies connected to one arm of one of said pairs of arms, first and second wave transmission paths coupled to the two arms respectively of the other of said pairs of arms, said paths being oriented to cross each other at right angles, an element of gyromagnetic material electromagnetically coupled to both of said paths in the vicinity of said crossover, means for biasing said element to gyromagnetic resonance at a frequency within said band of frequencies, reactive means for terminating each of said lines, and an output circuit connected to the other arm of said one pair of conjugate arms.

11. The combination according to claim 10 wherein said reactive means are located at a distance along said lines from said gyromagnetic element that is less than one-eighth wavelength for the highest frequency within said band of frequencies.

12. A double isolater comprising two 3 db directional couplers each having two pairs of conjugate branches, two wave transmission paths each connecting one branch of one of said pairs of conjugate branches of one directional coupler to a branch of one pair of conjugate branches of the other directional coupler, said paths crossing each other at right angles at a point along their respective lengths, and an element of magnetically polarized gyromagnetic material disposed between and electromagnetically coupled to said crossed paths.

13. A nonreciprocal electromagnetic wave device comprising a directional coupler having two pairs of conjugate branches, one branch of one of said pairs of branches crossing the other branch of said one pair in a region along their respective lengths, an element of magnetically polarized gyromagnetic material disposed between and electromagnetically coupled to said crossed branches, and low-loss, reflective means for terminating both of said crossed branches.

14. A double isolator comprising two directional couplers each having two pairs of conjugate branches, two wave transmission paths each connecting one branch of one of said pairs of conjugate branches of one directional coupler to a branch of one pair of conjugate branches of the other directional coupler, said paths crossing each other at a region along their respective lengths, and an element of magnetically polarized gyromagnetic material disposed between and electromagnetically coupled to said crossed paths.

References Cited in the file of this patent

UNITED STATES PATENTS

| | | |
|---|---|---|
| 2,916,712 | Artuso | Dec. 8, 1959 |
| 2,951,216 | Nelson | Aug. 30, 1960 |
| 3,016,497 | Kostelnick | Jan. 9, 1962 |
| 3,034,076 | Tomiyasu | May 8, 1962 |

FOREIGN PATENTS

| | | |
|---|---|---|
| 1,045,495 | Germany | Dec. 4, 1958 |
| 1,242,007 | France | Aug. 16, 1960 |